Sept. 18, 1973 M. VARLAS 3,759,739
ENVIRONMENTAL PROTECTION SYSTEM
Filed Aug. 26, 1971

INVENTOR.
MIKE VARLAS
BY
ATTORNEY

United States Patent Office 3,759,739
Patented Sept. 18, 1973

3,759,739
ENVIRONMENTAL PROTECTION SYSTEM
Mike Varlas, San Diego, Calif., assignor to General Dynamics Corporation, San Diego, Calif.
Filed Aug. 26, 1971, Ser. No. 175,235
Int. Cl. B05b 7/20; B32b 19/04
U.S. Cl. 117—105.2                5 Claims

ABSTRACT OF THE DISCLOSURE

A system for protecting the exposed surfaces of reinforced plastic composite structures which are exposed to the weather is disclosed. A sheet of asbestos paper is flame-sprayed with a conductive material, such as aluminum. The conductive surface is coated with a synthetic resin and then the composite is laminated over the structure surface. The resulting surface is resistant to erosion by rain and dust and protects against lightning strikes and static electricity build-up. This system is especially desirable for use on external aircraft structure, large storage tanks, etc.

BACKGROUND OF THE INVENTION

Recently, reinforced plastic structures having excellent strength and stress characteristics have been developed. These composite materials which often comprise high strength boron or graphite fibers in a synthetic resin matrix are being used in certain external aircraft structures. Typical composite materials are described in my copending U.S. patent application Ser. No. 38,368, filed May 18, 1970 now U.S. Pat. 3,649,435. While these materials have a number of advantages, such as ease of shaping and high strength-to-weight ratio, several disadvantages have been noted.

Many composite materials do not have the desired suface hardness and are subject to rapid wear due to rain erosion, sand erosion and other weathering effects when exposed to the environment.

Most of the composite materials are either electrically insulating or have high electrical resistance. These materials are subject to damage from lightning strikes and tend to bulid up and retain static electrical charges.

Attempts have been made to overcome these problems by painting the structures with silver pigmented paints or laminating aluminum foil over the suface. These techniques, while partially successful, complicate part manufacturue and the resulting surface is still subject to rapid deterioration through weathering.

Aluminum oxide and other oxide materials have also been flame-sprayed directly into a female mold immediately prior to molding of a composite structure therein. While the resutling surface layer is somewhat tougher than a painted coating, the layer prevents direct inspection of the composite structure surface for possible defects.

Thus, there is a continuing need for improved surface protection systems for reinforced plastic composite structures.

SUMMARY OF THE INVENTION

It is, therefore, an object of this invention to provide an environmental protection system for composite structures which overcomes the above-noted problems.

Another object of this invention is to provide a conductive protective surface for composite structures which resists rain and sand erosion in aircraft external structure applications.

Still another object of this invention is to provide an environmental protection system for composite structures which can be applied to a finished structure.

The above objects, and others, are accomplished in accordance with this invention by a system in which a conductive surface layer is flame-sprayed onto a sheet of asbestos paper, the conductive layer is coated with a synthetic resin and the sheet is bonded to a reinforced plastic composite structure to be protected.

The surface of the conductive layer is coated with a thin resin coating primarily to reinforce the mechanical bond between the metal and the asbestos fibers. Where an adhesive layer or film has been applied to the back of the sheet for use later in bonding the sheet to a structure, only the conductive surface will be coated. Where some other bonding technique is to be used, it is preferred that the entire sheet be impregnated with the coating resin. While the resin coating over the conductive surface may have any suitable thickness, if aerodynamic drag is important, the coating should have a thickness sufficient to smooth the somewhat irregular metal surface. However, where structural strength alone is required, coating thicknesses of less than one mil are often sufficient.

While any suitable conductive material, such as aluminum, copper, zinc, conductive oxides, etc. may be used for the conductive layer, aluminum and alloys thereof are preferred. Aluminum is lightweight, easily flame-sprayed and bonds well to the asbestos paper. While the conductive layer may have any suitable thickness, best results are obtained with layers from about 1 to 10 mils thick. Much thinner layers lack uniform conductivity, while there is a weight penalty in overly thick layers, since aluminum and most other conductors have densities greater than the usual composite structures.

The conductive layer may be applied by any flame-spraying technique. The layer may be directly applied to the asbestos surface, or a primer layer such as a 0.5 to 1 mil layer of zinc may be flame-sprayed onto the asbestos before the primary conductive material, such as aluminum, is applied. Such primer layers often improve adhesion of the conductive layer.

The asbestos sheet comprises a conventional paper made from asbestos fibers. A typical asbestos paper has chrysotile asbestos fibers of an average fiber diameter of from about 0.017 to $1.1 \times 10^{-6}$ inch, surface area of about 130,000 to 200,000 $cm.^2/gm.$, and about 0.85 to $1.4 \times 10^6$ fibrils per linear inch. While the paper may have any suitable thickness, generally best results are obtained with sheets having thicknesses in the 4–60 mil range. Asbestos paper bonds well to flame-sprayed layers, and has excellent thermal insulation and flame retarding properties.

The flame-sprayed asbestos paper sheets may be coated and/or impregnated with any suitable synthetic resin by any suitable method. Typical synthetic resins include polyolefins such as polyethylene and polypropylene; vinyl and vinylidene polymers such as polystyrene and polyvinylacetate; fluorocarbons such as polytetrafluoroethylene and polyvinyl fluoride; polyamides such as polycaprolactam; polyimides; polyesters such as polyethyleneterthalate; polyurethanes; polypeptides such as casein; polysulfides; polysulfones; polycarbonates; cellulosic polymers such as viscose; phenolic resins such as phenolformaldehyde resins; polyesters; epoxy resins; silicon resins; alkyl and alkyl resins; and mixtures and copolymers thereof. Impregnation may be accomplished by any suitable technique, such as solution dipping, spraying, hot-melt coating, etc. For large sheets which are to be formed into relatively complex shapes, dip-coating is generally preferred. Where smaller sheets are used, it is often preferred to press the sheet against a resin film or sheet, heating the sheet to the resin melting temperature to cause flow and impregnation. The resin impregnation results in a strong reinforced plastic surface layer for the composite structure to be protected. For optimum physical properties in the final structure, epoxy and polyimide resins are preferred.

The flame-sprayed asbestos sheet may be bonded to the composite structure by any suitable technique. The impregnating resin, discussed above, may also be used as the bonding agent by bringing the impregnated sheet into contact with the structure before final cure of the resin. Alternatively, the sheet may be bonded to the structure with any suitable adhesive or bonding agent after the impregnating resin has hardened. If desired a thin film or layer of a hot-melt adhesive may be applied to the back of the asbestos sheet prior to flame-spraying, or after the conductive surface is formed but before the resin overcoating is applied. The resulting composite sheet may then be bonded to a structure under heat and pressure. Generally, for processing simplicity and to assure uniform lamination, it is preferred to utilize the impregnation resin as the bonding agent. Moderate contact pressure, such as about 5–15 p.s.i.g., should preferably be used to hold the impregnated asbestos sheet in uniform contact with the structure.

BRIEF DESCRIPTION OF THE DRAWING

Details of the invention, and of certain preferred embodiments, will be further understood upon reference to the drawing, wherein.

DETAILED DESCRIPTION OF THE INVENTION

Figure 1:
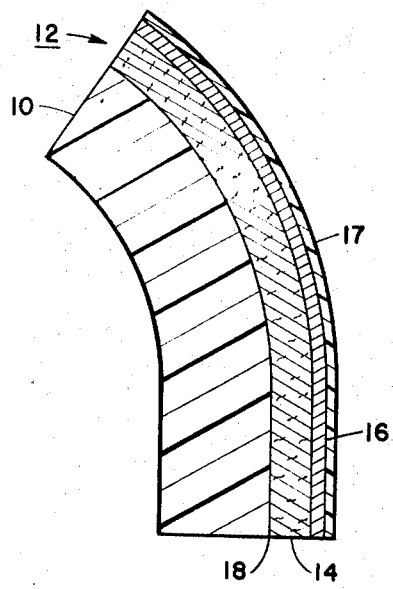
FIG. 1 shows a cross-sectional view through a protective overlay according to this invention.

Referring now to FIG. 1, there is seen a section taken normal to the surface through a reinforced plastic composite structure 10 having a composite protective surface layer generally designated 12. Layer 12 comprises a resin impregnated asbestos sheet 14 having a flame-sprayed conductive coating 16, such as aluminum and a protective resin overcoating 17. The flame-sprayed coating 16 will, of course, penetrate somewhat between the asbestos fibers at the surface of the paper sheet, assuring a tenacious bond. Where the impregnating resin is also used to bond sheet 14 to structure 10, the asbestos fibers will extend into substantial contact with the structure surface. Alternatively, coated asbestos sheet 14 may be bonded by an adhesive layer at interface 18, which will tend to impregnate sheet 14.

Figure 2:
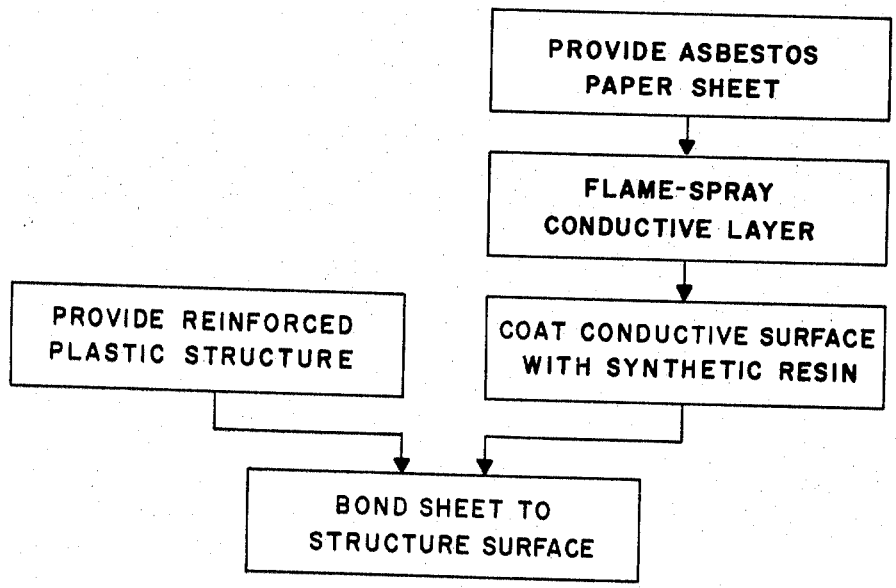
FIG. 2 is a schematic flow diagram illustrating the steps in constructing the environmental protection system shown in FIG. 1.

FIG. 2 illustrates, in schematic flow sheet form, a preferred embodiment of the method of manufacturing the surface protection system of this invention. As seen in FIG. 2, an asbestos paper sheet is flame-sprayed with a conductive layer, such as aluminum, then is coated with a synthetic resin. As discussed above, either the conductive surface alone is coated, or the entire sheet can be coated and impregnated with the resin. The sheet is then bonded to the surface of the reinforced plastic structure to be protected, either by means of the impregnation resin or by means of a separate adhesive.

The method of constructing this environmental surface protection system is further detailed in the following examples, which describe preferred embodiments of this method.

Example I

An airplane wing panel, made up of a composite comprising graphite fibers in an epoxy resin matrix, is to be protected. A sheet of chrysotile asbestos paper (available from Raybestos Manhattan under the trademark Novabestos) having a thickness of about 6 mils is flame-sprayed with aluminum using a ⅛" diameter Metco S–F aluminum wire to a thickness of about 10 mils, using a Metco metal spraying unit, type- 4–E machine. The sheet is then dipped into a solution containing a catalyzed Epon 815 resin (an epoxy resin available from Shell Chemical Co.) solution to thoroughly impregnate it with the resin. The sheet is then brought into contact with the surface of the composite wing panel and held thereagainst under about 10 p.s.i.g. The resin is then cured at room temperature. The result is a hard, tough surface which resists lightning and static electricity build-up.

Example II

A protective surface layer is to be applied to a flat reinforced plastic panel. A 10 mil sheet of asbestos paper is flame-sprayed with aluminum as described in Example I to a coating thickness of about 7 mils. A 5 mil sheet of a hot melt adhesive available under the trademark FM 1000 from American Cyanamid is placed on the uncoated surface of the asbestos sheet and pressed thereagainst at a temperature of about 165° C. and a pressure of about 100 p.s.i.g. The adhesive melts and thoroughly penetrates the asbestos sheet. The sheet is cooled, allowing the adhesive to harden, producing a flat, rigid sheet. The uncoated surface of the sheet is then sprayed with a thin coating of Epon 815 a catalyzed epoxy resin and pressed lightly against the composite surface to be protected. After allowing the epoxy resin to cure, the asbestos sheet is found to adhere tenaciously, resulting in a surface offering excellent erosin and electrical protection.

Example III

A structure comprising boron fibers distributed in a polyester matrix is to be protected. A 20 mil sheet of asbestos paper is flame-sprayed with about a 0.5 mil layer of zinc, using ⅛ in. zinc wire in a Metco metal spraying unit, type 4–E, at the following flow readings: air, 57 c.f.m.; oxygen, 28 c.f.m.; and acetylene, 28 c.f.m. Then, a 7 mil overlayer of aluminum is applied, using the Metco unit with ⅛ in aluminum wire at flow readings of air, 57 c.f.m.; oxygen, 31 c.f.m.; and acetylene, 31 c.f.m. The coated sheet is then dipped into a solution of RS–6234 polyimide resin (available from Monsanto Corp). After the sheet is thoroughly coated and impregnated, the sheet is removed and the resin is cured. The back of the sheet is then coated with FM 434 polyimide adhesive (available from American Cyanamid) and pressed against the structure to be protected. The adhesive is cured at about 170° C. under pressure of about 15 p.s.i.g. from a vacuum bag assembly. The resulting composite structure has excellent surface hardness and electrical properties.

Although specific ingredients, structures and assembly steps have been described in the above detailed descriptions of the invention, where suitable, other ingredients, components, etc. may be used, as indicated above, with similar results.

Other modifications, applications and ramifications of the present invention will occur to those skilled in the art upon reading the present disclosure. These are intended to be included within the scope of this invention as defined in the appended claims.

I claim:

1. A method of protecting reinforced plastic composite structures from environmental damage which comprises the steps of:
   (a) providing a sheet of asbestos paper;
   (b) flame-spraying a metal layer directly onto a first surface of said sheet;
   (c) contacting said sheet and metal layer with a synthetic resin to impregnate said sheet with resin and form a resin film over the exposed surface of said metal layer;
   (d) placing the second surface of said impregnating sheet against and in intimate contact with an electrically insulating reinforced plastic composite structure to be protected; and
   (e) hardening said resin while said contact is maintained so that said resin serves to both fill and reinforce said sheet and to bond said sheet to said structure.

2. The method according to claim 1 wherein said resin is selected from the group consisting of epoxy resins, polyimides, polyurethanes, phenolic resins and mixtures and copolymers thereof.

3. The method according to claim 1 wherein said conductive layer comprises a material selected from the group consisting of aluminum, zinc and copper, and is formed to a thickness of from about 1 to about 10 mils.

4. The method according to claim 1 wherein said asbestos paper comprises chrysotile asbestos and has a thickness of from about 4 to about 60 mils.

5. The method according to claim 1 wherein said sheet is impregnated with said resin by dipping said sheet into said resin.

References Cited

UNITED STATES PATENTS

| | | | |
|---|---|---|---|
| 3,009,041 | 11/1961 | Zlupko | 117—105.2 X |
| 3,172,775 | 3/1965 | Shaines | 117—140 A |
| 3,649,435 | 3/1972 | Varlas | 161—156 |
| 3,138,517 | 6/1964 | Charbonneau | 161—214 |
| 3,505,101 | 4/1970 | Koffskey et al. | 117—105.2 |
| 3,496,057 | 2/1970 | McCluer | 117—71 R |
| 3,649,406 | 3/1972 | McNish | 117—105.2 |
| 3,372,054 | 3/1968 | Wishnie et al. | 117—105.2 |
| 2,638,428 | 5/1953 | Gordon et al. | 161—205 |
| 3,589,971 | 6/1971 | Reed | 161—205 |
| 3,132,065 | 5/1964 | Barsy et al. | 161—205 |
| 3,539,440 | 11/1970 | Gerek et al. | 117—126 A B |

CHARLES E. VAN HORN, Primary Examiner

U.S. Cl. X.R.

117—71 R, 126 AF, 126 AB, 140 R, 140 A, 217, 218; 156—82, 278; 161—205, 213, 214